United States Patent [19]

Wise

[11] Patent Number: 4,928,140
[45] Date of Patent: May 22, 1990

[54] HIGH SPEED APERTURE CARD PRINTER AND METHOD

[75] Inventor: David S. Wise, Solon, Ohio
[73] Assignee: Tameran, Inc., Chagrin Falls, Ohio
[21] Appl. No.: 319,964
[22] Filed: Mar. 7, 1989
[51] Int. Cl.⁵ .............................................. G03B 27/48
[52] U.S. Cl. ........................................ 355/48; 355/49; 355/50
[58] Field of Search ............................... 355/46, 48–51, 355/75, 230, 45, 77, 66, 65; 346/160; 353/27 R

[56] References Cited
U.S. PATENT DOCUMENTS

| | | | |
|---|---|---|---|
| 4,043,661 | 8/1977 | Yamada et al. | 355/50 |
| 4,320,963 | 3/1982 | Satomi | 355/75 |

Primary Examiner—L. T. Hix
Assistant Examiner—D. Rutledge
Attorney, Agent, or Firm—Calfee, Halter & Griswold

[57] ABSTRACT

A high speed aperture card printer and method include a rotatable glass cylinder temporarily to transport aperture cards fed one directly after the other onto the cylinder. The aperture cards are tightly held against the cylinder by parallel endless belts positioned on either side of the microfilm carried by the aperture card so as to leave one surface of the microfilm uncovered. The printer includes an optics system passing light radially outwardly through the rotating glass cylinder and the microfilm transported thereby optically to scan images on the microfilm for printing copies thereof on plain paper.

23 Claims, 3 Drawing Sheets

HIGH SPEED APERTURE CARD PRINTER AND METHOD

FIELD OF THE INVENTION

The present invention relates to an aperture card printer, in general, and to a high speed aperture card transport system for that printer, in particular.

BACKGROUND OF THE INVENTION

Aperture cards have become a frequently utilized method for storing information. The standard size aperture card is 7⅜ inches long and 1¾ inches wide. A microfilm piece is mounted in the aperture of the aperture card. This microfilm piece is a reduced size image of a document or drawing and has a dark background with clear letters, characters or lines appearing thereon. The microfilm piece is mounted in an aperture positioned in the same location on every card. The front edge of the microfilm is approximately 0.764 inches from the leading edge of the card, and the side edges of the microfilm are approximately 1.021 inches from the respective side edges of the aperture card.

In known aperture card printers on the market, a stack of aperture cards for printing is positioned in a supply bin. Drive rollers cooperate with a knife edge on the feed aperture from the bin to remove one card at a time from the bin. The removed card is driven by a roller system to a carriage pickup position. At such position, glass flats are clamped on both sides of the microfilm piece to hold it in a flattened condition. The glass flats are mounted on a reciprocally driven carriage.

With the microfilm in the aperture card sandwiched between the opposed glass flats, the carriage is advanced through an optics system to scan the image on the microfilm piece for printing. When the microfilm piece has been advanced through and beyond the optic system, the carriage is stopped, the glass flats are opened and the aperture card is removed from the carriage by an exit roller system. The carriage with the opened glass flats is then cycled back to its pickup position to receive the next aperture card for printing.

The conventional aperture card transport system consists of a series of interrupted reciprocal movements. One aperture card cannot be fed directly after another aperture card through the optics system because of such interrupted reciprocal motions. As such, the printing speed of this system is relatively slow with the capacity to make approximately ten prints per minute. In addition, with the feeding and clamping motions involved, the handling of the aperture card is relatively rough and may cause damage to the card or microfilm, particularly when attempts are made to speed up the printing process. This may shorten the life of the aperture card and/or the microfilm piece carried thereby.

In addition, the glass flats with their repeated reciprocal clamping actions are subject to wear, scratches and mis-alignment and are also continually exposed to dust and dirt. Scratches, dust or dirt on the glass flats positioned on opposite sides of the microfilm piece create image imperfections when the microfilm piece is optically scanned resulting in image imperfections on the print made. In addition, the glass flats are subject to continuing maintenance problems and must be replaced from time to time.

SUMMARY OF THE INVENTION

The principal object of the present invention is to provide a high speed aperture card transport system in an aperture card printer. For this purpose, a rotating hollow glass cylinder transports the aperture cards through the light path of the optics system for the printer. Aperture cards may be fed one directly after the other onto the cylinder in end to end relationship. As such, as one aperture card is being removed from the cylinder after printing, the next immediately following aperture card is being advanced to and through the light path of the optics system, thereby to greatly enhance the aperture card printing speed.

It is yet another object of the present invention to more gently handle the card and the microfilm piece carried thereby during transport through the system. The aperture cards are continuously fed onto the radially outer surface of the glass cylinder and are held in place by endless drive belts having a drive flight and a return flight. The endless drive belts smoothly engage the radially outer surface of the aperture card on opposite sides of the microfilm piece. The rotating hollow glass cylinder and endless drive belts forming the principal components of the transport system do not subject the transported card to rough clamping actions or interrupted reciprocal motions.

It is still another object of the present invention to provide a high speed aperture card printing system with improved copy quality and maintenance features. To this end, the radially outer surface of the microfilm piece is uncovered, and thus the light passes through the glass cylinder and microfilm piece only, rather than passing through two glass flats and the microfilm piece. Thus, the present invention eliminates any image imperfections that might be caused by dust, dirt or scratches on the second glass flat. In addition, the glass cylinder has its radially outer surface exposed for slightly less than 180° of its circumferential extent for ready access for maintenance and cleaning purposes. By eliminating reciprocal clamping actions and by providing easy maintenance access, the rotating glass cylinder of the aperture card transport system should have a relatively long operational life with reduced maintenance requirements.

Still another object of the present invention is to provide an optics system for a high speed aperture card printer utilizing a rotating glass cylinder as the principal transport mechanism. For this purpose, in the preferred mode, the light source directs a light beam into the hollow, open ended rotating glass cylinder. An angularly mounted mirror fixedly positioned within the rotating glass cylinder reflects the light beam radially outwardly through a condensing lens, the rotating glass cylinder, the microfilm piece and the objective lens for subsequent reflection to the image magnification and printing structures. Alternatively, the light source could direct the light beam radially inwardly through the condensing lens, microfilm piece, glass cylinder, and objective lens to the mirror inside the cylinder for subsequent reflection to the magnification and printing structures.

The invention, then, comprises the features hereinafter fully described and particularly pointed out in the claims, the following description and annexed drawings setting forth in detail certain illustrative embodiments of the invention, these being indicative, however, of but a few of the various ways in which the principals of the invention may be embodied.

DETAILED DESCRIPTION OF THE PREFERRED EMBODIMENTS

Figure 1:
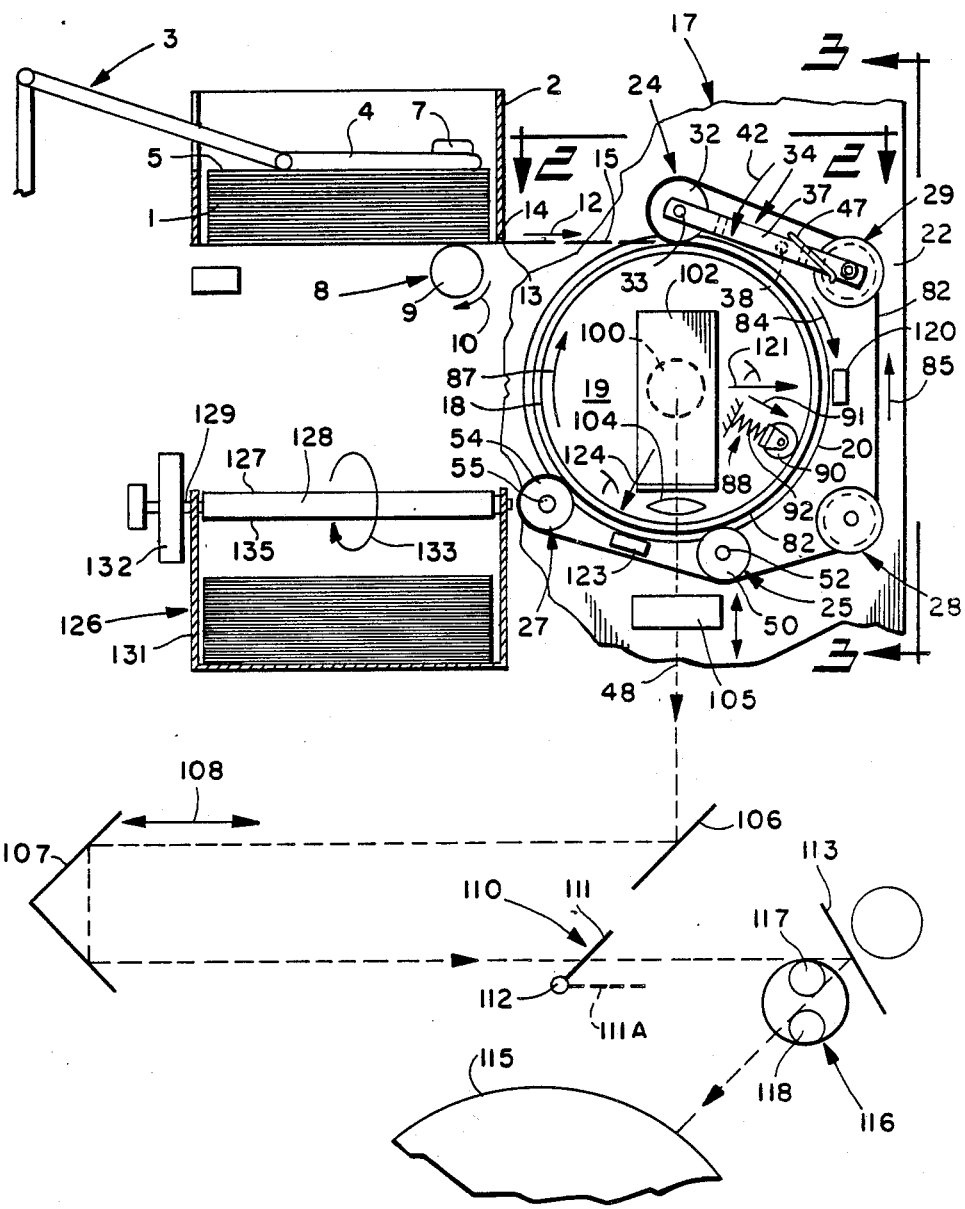
FIG. 1 is a schematic front elevation of the aperture card transport system and optics system utilized in the high speed aperture card printer of the present invention, with the front side plate being removed for clarity of illustration.

Turning now in more detail to the drawings and initially to FIG. 1, a stack 1 of aperture cards is positioned in a supply bin 2 of the aperture card printer. An articulated arm assembly, indicated generally at 3, has its distal arm 4 resting on the upper surface of the top aperture card 5 in stack 1. The distal arm 4 has a weight 7 thereon to apply a downward force to the stack of aperture cards 1 urging the same toward a supply bin drive wheel assembly, indicated generally at 8.

The drive wheel assembly includes two laterally spaced drive wheels 9 engaging the bottom surface of the bottom aperture card 5 on opposite sides of the microfilm piece carried in the aperture of the aperture card. The drive wheels 9 are driven in the direction of arrow 10 by an independent motor or by an overrrunning clutch assembly driven by the main motor of the transport system. The drive wheels 9 feed the bottom card out of the supply bin 2 in the direction of arrow 12. In such movement, the aperture card 5 passes through a feed slot 13 at the bottom of an end wall of supply bin 2. A knife edge 14 is provided adjacent the top edge of feed slot 13 to reliably separate one aperture card at a time from the stack for delivery along a feed plate 15 to the transport mechanism, indicated generally at 17.

The transport mechanism 17 includes a rotating, hollow glass cylinder 18. Preferably, the cylinder is made of Pyrex glass, has a diameter of 5.118 inches and a thickness of ⅛th inch. While Pyrex glass is preferred, the cylinder 18 may be made of any material transmissive to the type of radiant energy being used in the optics system of the printer.

The cylinder 18 is preferably open ended and has a hollow bore 19 running along its entire length. The respective ends of the glass cylinder 18 are received in circular openings 20 in parallel back and front side plates 22 and 23, respectively. The glass cylinder 18 is held and rotated by an endless belt drive assembly carried by the parallel side plates 22 and 23.

The endless belt drive assembly includes a first drive roll assembly, indicated generally at 24, a second drive roll assembly, indicated generally at 25, a third drive roll assembly, indicated generally at 27, a first idler roll assembly, indicated generally at 28, and a second idler roll assembly, indicated generally at 29. The three drive roll assemblies 24, 25 and 27 are positioned immediately adjacent the glass cylinder 18, while the two idler roll assemblies 28 and 29 are radially outwardly spaced from the glass cylinder 18.

The first drive roll assembly 24 includes laterally spaced rolls 31 and 32 fixedly mounted on shaft 33, which is rotatably mounted to a pivotal frame assembly, indicated generally at 34. The frame assembly 34 includes laterally spaced, parallel side arms 35 and 37. The shaft 33 extends between and is rotatably journaled in the distal ends of side arms 35 and 37. The frame assembly 34 is rigidified by a tie bar 38 extending between and being welded at its ends to the side arms 35 and 37, as indicated at 39. The proximal ends of side arms 35 and 37 have holes therein through which a rotatable through shaft 40 extends. The through shaft 40 extends between and is rotatably journaled to side plates 22 and 23.

The side arms 35 and 37 of frame assembly 34 are free to pivot in unison relative to through shaft 40. The frame assembly 34 is normally resiliently biased toward the glass cylinder 18 about through shaft 40, as indicated by arrow 42 in FIG. 1. For this purpose, a first spring 43 is coiled around shaft 40 between back side plate 22 and side arm 35. One end of the spring 43 is secured to the side plate 22 and the other end of the spring extends over the top of the side arm 35, as indicated at 44, to apply the counterclockwise bias illustrated in FIG. 1. Similarly, a second spring 46 is coiled around through shaft 40 between front side plate 23 and side arm 37. One end of second spring 46 is connected to front side wall 43 and the other end of spring 46 is bent over the top of side arm 37, as indicated at 47, to assist in applying the counterclockwise bias to the frame assembly 34.

The second drive roll assembly 25 is positioned immediately upstream of the optical path 48 of the optics system for the printer. The second drive roll assembly 25 includes two laterally spaced rolls 49 and 50 mounted on a rotatable through shaft 52. Through shaft 52 extends between and is rotatably journaled to back side plate 22 and front side plate 23.

The third drive roll assembly 27 includes two parallel, laterally spaced rolls 53 and 54 mounted on a rotatable, driven through shaft 55. This through shaft extends between and is rotatably journaled to the side plates 22 and 23. The rear end of driven shaft 55 has a back portion 57 extending through and behind back side plate 22.

A pulley 58 having parallel drive grooves 59 and 60 is mounted on back portion 57 of through shaft 55. An endless drive belt 62 extends around and between first drive groove 59 on pulley 58 and the drive shaft of a reversible motor (not shown). Drive belt 62 is thus driven by the main motor of the transport mechanism of the card printer. When drive belt 60 is driven, rotation is imparted to shaft 55 and to rolls 53 and 54 carried thereby. Shaft 55 is the only driven shaft for the transport mechanism of the present invention. If desired, a second belt 63 may extend around and between second drive groove 60 on pulley 58 and an overrunning clutch assembly for the card feed assembly 8.

Figure 3:
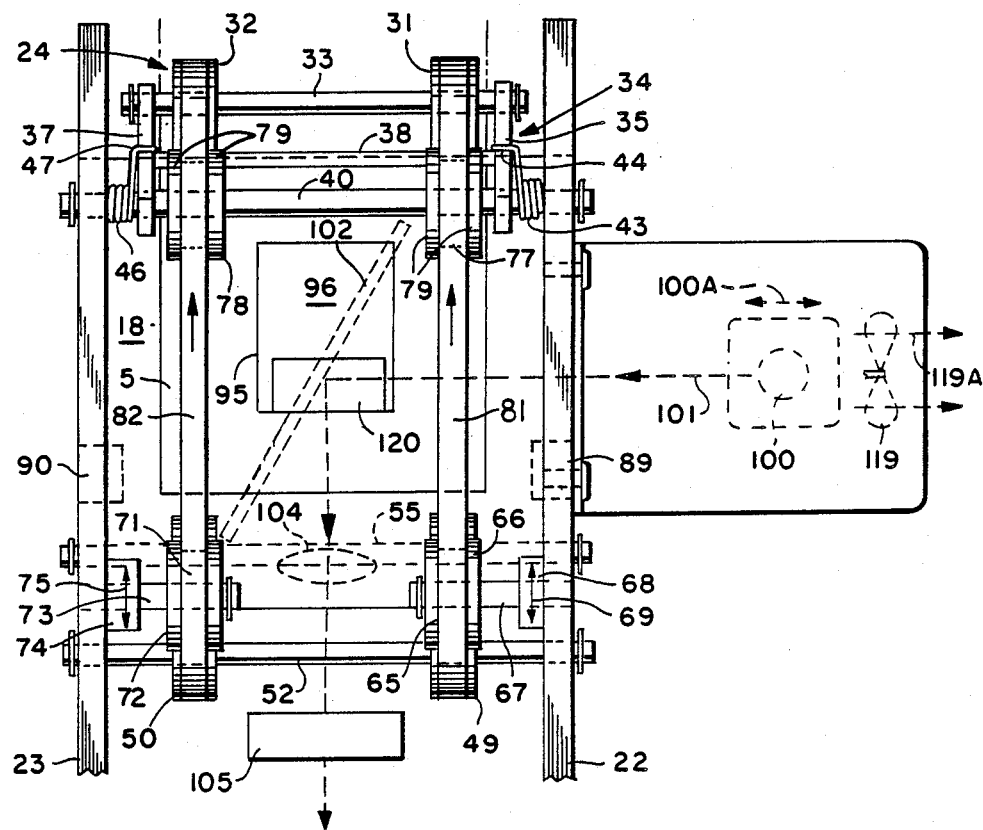
FIG. 3 is a side elevation taken generally along the plane 3—3 of FIG. 1 showing an aperture card carried on the radially outer surface of the rotating glass cylinder and further showing the endless belt drive system and light house.

The first idler roll assembly 28 includes a first roll 65 having parallel side flanges 66 of greater diameter than the roll itself. As best shown in FIG. 3, the first roll 65 is rotatably mounted on a stub shaft 67 adjustably mounted on back side plate 22 by a mounting bracket 68. The mounting bracket 68 may be moved relative to back side plate 22, as schematically indicated by arrows 69, for adjusting the position of first roll 65 relative to the back side plate, as will be discussed in more detail hereinafter.

The first idler roll assembly 28 further includes a second roll 71 laterally spaced from and parallel to roll 65. The roll 71 has two parallel side flanges 72 thereon, such parallel flanges having a greater diameter than the second roll 71. The roll 71 is mounted on rotatable stub shaft 73 adjustably mounted on the inside surface of front side plate 23 by adjustable bracket 74. This adjustable bracket may be moved relative to front side plate 23, as schematically indicated by arrows 75, to adjust the relative position of the second roll 71, as will be described in more detail hereinafter.

The second idler roll assembly 29 includes a first roll 77 and a second roll 78 mounted on rotatable through shaft 40. Each of the rolls 77 and 78 have parallel side flanges 79 thereon. These side flanges have a greater diameter than the diameter of the roll to assist in endless belt alignment.

The endless belt drive includes a first endless, flexible belt 81 and a second endless, flexible belt 82. The first endless belt 81 is entrained around aligned rolls 31, 49, 53, 65 and 77. The second endless belt 82 is entrained around aligned rolls 32, 50, 54, 71 and 78. Tension is maintained on each of the endless drive belts 81 and 82 by independently adjusting either idler roll 65 or idler roll 71, as required.

The parallel endless drive belts 81 and 82 are synchronously driven by the main motor through the driven shaft 55. The endless drive belts 81 and 82 have a drive flight extending between the first and third drive assemblies around the cylinder 18 as indicated by arrow 84, and a return flight radially outwardly spaced from cylinder 18 extending from the third drive assembly 27 back to the first drive assembly 24 by way of the idler roll assemblies, as indicated by the arrow 85.

As seen in FIG. 1, the first, second and third drive roll assemblies, 24, 25 and 27, respectively, in conjunction with endless drive belts 81 and 82 cradle and rotatably drive the hollow glass cylinder 18. The glass cylinder 18 can be placed in or removed from the endless belt drive mechanism by pivoting the frame assembly 34 radially outwardly in a clockwise direction, as viewed in FIG. 1, to provide clearance for cylinder insertion or removal. The cylinder 18 has its entire radially outer surface exposed between the third drive roll assembly 27 and the first drive roll assembly 24, in the normal direction of cylinder rotation as indicated by arrow 87 in FIG. 1. The outer surface of the glass cylinder 18 is thus readily accessible for cleaning and maintenance purposes.

The glass cylinder 18 is stabilized in its drive position by a stabilizer roll assembly, indicated generally at 88. This stabilizer roll assembly may include a back stabilizer roll 89 and a front stabilizer roll 90 positioned in the internal bore 19 of glass cylinder 18. Each of the stabilizing rolls 89 and 90 is biased radially outwardly in the direction of arrow 91 by a spring, schematically illustrated at 92. The stabilizing rolls 89 and 90 are thus urged outwardly into engagement with the radially inner surface of the glass cylinder 18. These stabilizing rolls resist drive forces imparted on the cylinder 18 by the endless belt drive system that might otherwise urge the cylinder away from the drive roll cradle.

While the stabilizing roll position illustrated in FIG. 1 is preferred, a stabilizing roll assembly could also be positioned radially outside of the cylinder 18 between third drive roll assembly 27 and first drive roll assembly 24 in the direction of arrow 87. However, this position of the stabilizing roll assembly might inhibit access to the glass cylinder 18 for cleaning and maintenance purposes.

Turning again to the aperture card transport through the printing system, the aperture card 5 removed from bin 2 travels along feed plate 15 to the drive nips respectively formed between the endless belts 81 and 82 and the radially outer surface of the glass cylinder 18 at the first drive roll assembly 24. The aperture card is smoothly drawn onto the radially outer surface of glass cylinder 18 by the drive flights of the endless drive belts in the direction of arrow 84. The aperture card 5 is smoothly bent to conform to the curvature of cylinder 18 and is held tightly against the radially outer surface of the glass cylinder 18 by the endless drive belts 81 and 82.

As best shown in FIG. 3, the radially outer surface of the aperture card 5 is engaged by the drive belts 81 and 82 on opposite sides of the aperture 95 in aperture card 5. The microfilm piece 96 carried in aperture 95 of the aperture card 5 is thus uncovered in its entirety along its radially outer surface. The belts 81 and 82 are maintained in proper spaced alignment relative to one another to engage only the marginal surfaces of the card 5 by the flanged rollers on first and second idler roll assemblies 28 and 29, respectively.

The aperture card tightly held on the outer surface of cylinder 18 is advanced by rotation of that cylinder to the optics system of the printer for slit image scanning of the microfilm piece. The second drive roll assembly 25 is positioned immediately adjacent the optical path 48 of the optics system to insure that the card is tightly held against the outer surface of the cylinder as it rotates through and past the optical path of the optics system to minimize distortion in the microfilm during optical scanning.

Figure 2:
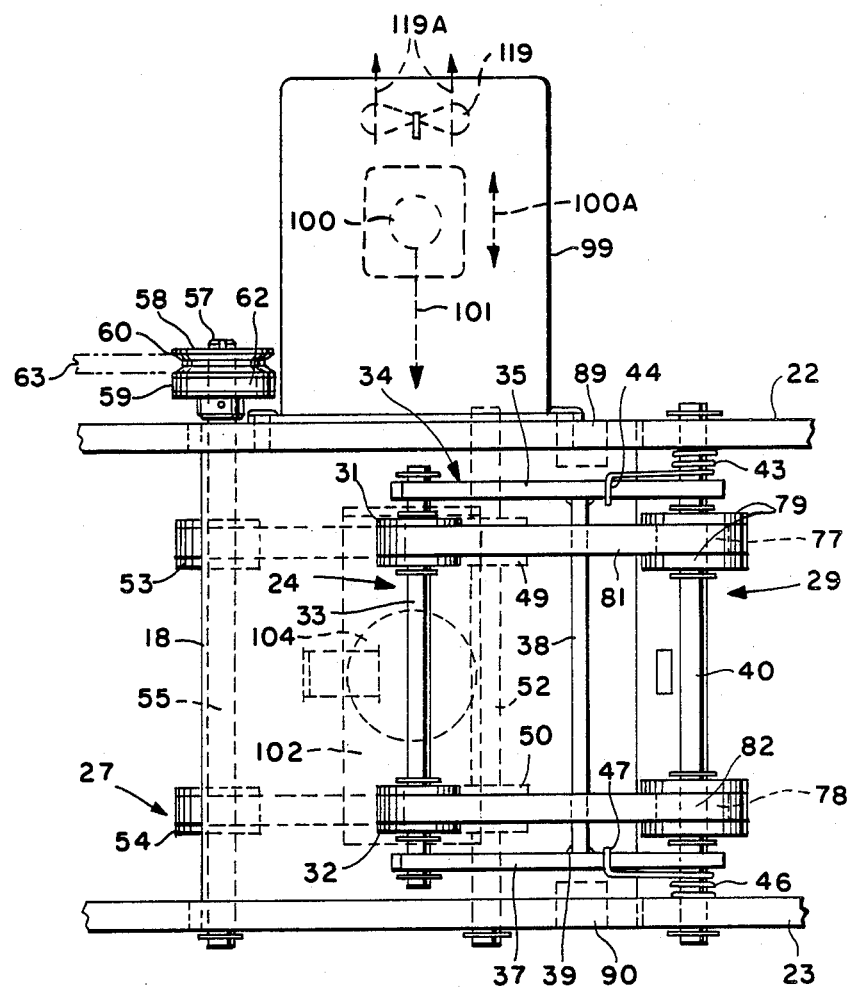
FIG. 2 is a top plan view of the rotating glass cylinder, endless belt drive system and light house taken generally along the plane 2—2 of FIG. 1, with the aperture card feed plate between the supply bin and cylinder being eliminated for clarity of illustration.

As best shown in FIGS. 2 and 3, the optics system includes a light house 99 connected to and extending rearwardly from the rear side plate 22 A radiant energy source 100, preferably a quartz halogen lamp, is mounted in the light house 99 and may be moved forwardly and rearwardly therewithin, as schematically indicated by the arrows 100A. The lamp 100 emits a light beam 101 that travels along the optical path 48 of the optics system. The light beam is directed through the open end of cylinder 18 into bore 19 thereof. As best shown in FIG. 3, that light beam is reflected off angled mirror 102. Such mirror is fixedly mounted within the bore 19 of cylinder 18.

The reflected light beam then travels radially outwardly through a condensing lens 104, the glass cylinder 18 and the microfilm piece moving therepast. The condensing lens 104 focuses the light beam onto the microfilm piece. The light beam 101 does not have to pass through a cover glass on the radially outer surface of the microfilm piece, thereby to improve the quality of the optics and the resultant print. Only the center line of light beam 101 is used for the slit image printing employed by the present invention.

Upon leaving the microfilm, the light beam passes through an objective lens 105. The focal length of the objective lens 105 must be selected for the microfilm pieces being printed, and different objective lens may be interchanged and installed in the printing optics in accordance with that selection process.

The light beam passing through objective lens 105 is reflected off mirror 106 to a pair of zoom mirrors 107. The zoom mirrors are simultaneously adjustable, as indicated by the arrows 108, to reposition the same for the magnification required to enlarge from the microfilm image size being printed to the desired print or copy size. Zoom mirrors 107 are driven as a pair by a stepper motor (not shown). The light beam is sequentially reflected off the pair of zoom mirrors toward a shutter assembly indicated generally at 110.

The shutter assembly 110 includes a shutter 111 secured to a shaft 112 rotatably mounted on the frame. The shaft 112 is selectively arcuately driven in either direction by a solenoid motor (not shown). The shutter may be driven between a closed position, indicated in full lines in FIG. 1, and an open position, indicated in dotted lines 111A. When the shutter is in its closed position, the optical path 48 of the light beam 101 is blocked for edge masking functions. When the shutter is in its open position 111A, the light beam 101 along optical path 48 passes through the shutter assembly 110 toward a mirror 113.

The light beam is reflected off mirror 113 and directed toward a photoconductive reproduction drum 115. The optical path for the light beam between mirror 113 and drum 115 passes through an aperture control device, indicated generally at 116.

The aperture control device 116 includes two parallel rods 117 and 118 rotatably mounted on a frame assembly. Depending upon the degree of rotation of the rods relative to the optical path passing therethrough, the effective size of the aperture defined therebetween can be enlarged or decreased. By enlarging the aperture size, the light exposure on the photoconductive drum 95 is increased and vice versa. The position of the parallel rods 97 and 98 during printing of a given microfilm image is controlled to provide drum light exposure correlated to the background density data for the microfilm image on the microfilm piece.

The microfilm image optically carried by the light beam is exposed as a latent image on the photoconductive drum 115. Because of the zoom mirrors 107, this latent image is substantially the size of the plain paper being printed. The latent image is transferred to the paper travelling along a paper feed path passing tangentially to the photoconductive drum 115. The photoconductive drum reproduction technique is conventional except that the charges on the drum and toner are opposite to the conventional reproduction system because microfilm has a dark background and clear characters and lines, instead of the reverse.

The principal components of the optics and card transport systems are air cooled during the optical scanning process. For this purpose, a fan 119 may be mounted in the light house between light source 100 and the end wall of the light house. The fan 119 draws relatively cool ambient air across and through glass cylinder 18 and then across the base of and socket for light source 100, as schematically indicated by arrow 119A.

The aperture card transport on cylinder 18 is coordinated with the printing optics by two sensors. The first sensor 120 is positioned about halfway between the first drive roll assembly 24 and the second drive roll assembly 25. A portion of the unused optical cone of light beam 101 is reflected by a secondary mirror (not shown) radially outwardly, as indicated at 121, toward the first sensor 120. The first sensor 121 detects the leading edge of aperture card 5 being driven therepast on the radially outer surface of cylinder 18.

This detection by sensor 120 is used to ready the optics system of the printer and to program deceleration of the cylinder 18 as the microfilm piece goes through the slit image scan by the light beam. The cylinder 18 is thus driven at relatively high surface speeds, for example, about 8 linear inches per second or about 160 revolutions per minute, during transport of the cards between scans and is driven at a relatively slower surface speed, for example, about 1 linear inch per second or about 20 revolutions per minute, during microfilm piece scanning by the optics system. Of course, it will be appreciated that depending upon the particular application, such as the size of the finished print and the speed of the printing system, these speeds may be varied. The first sensor may also be used to control the feed of aperture cards 5 from supply bin 2 to the cylinder so as to have one card immediately follow the preceding card.

The second sensor 123 is positioned just downstream of the optical path 48 of light beam 101. A portion of the unused optical cone of the light beam 101 is reflected by a secondary mirror (not shown) radially outwardly toward the second sensor 123 as indicated at 124. The second sensor 123 detects the leading edge of a card 5 transported by the cylinder 18. Because of the fixed distance between the leading edge of the card 5 and the leading edge of the aperture 95, the second sensor 123 detects the leading edge of the card 5 just as the leading edge of the microfilm image piece is about to enter the center line of the printing optics. The second sensor synchronizes the optics system to the paper feed to provide proper positioning of the printed image on the paper and to provide proper operation of the shutter assembly 110.

If one copy of each microfilm image has been selected, the cylinder 18 is continuously driven in the direction of arrow 87 to continuously transport cards sequentially past the optics system. However, if multiple copies of the image on a microfilm piece are desired, the drive motor for glass cylinder 18 is reversed after one scan to in turn reverse the direction of rotation of the cylinder 18. The aperture card is then transported in the opposite direction until the microfilm piece carried thereby is once again positioned upstream of the optical path 48. The drive motor is then automatically reversed to its normal direction to resume drive of the cylinder 18 in the clockwise direction as indicated by the arrow 87. The microfilm image piece is then transported through the optics system for another slit image scanning process to produce a second copy of the same image on the same microfilm piece. This motor reversal function may be repeated as many times as necessary for the number of prints selected.

As will be apparent from the above description, the aperture cards 5 are fed onto the cylinder 18 one right after the other in direct end to end relationship. As such, the printing speed provided by the aperture card transport system is greatly enhanced to approximately 20 prints per minute because another card is immediately entering the optics system as the preceding card is being removed from the glass cylinder 18.

For this purpose, a card removal assembly, indicated generally at 126, is positioned just downstream of the third drive roll assembly 27. The aperture card 5 being removed is driven by the endless belt drive assembly outwardly onto a first horizontal surface 127 of receiving table 128. The receiving table 128 is rotatably mounted by a shaft 129 to the top of card reception bin 131. The shaft 129 is rotatably driven by a motor 132 through 180° increments, as schematically illustrated by arrow 133.

When an aperture card 5 has been received on surface 127 of table 128, the table is rotated through an arc of 180° to drop the aperture card 5 into the reception bin 131. With this rotation, a second opposed horizontal surface 135 then faces upwardly to receive the next aperture card being removed from cylinder 18. By utilizing rotatable table 128 to flip the removed cards 5, the stack of cards in the receiving bin 131 is in the same order and orientation as the stack of cards 1 in supply bin 2.

It will be apparent from the foregoing that changes may be made in the details of construction and configuration without departing from the spirit of the invention as defined in the following claims.

I claim:

1. A high speed aperture card printer comprising:
   a supply means containing one or more aperture cards, each of which carries a microfilm piece in an aperture spaced predetermined distances from the leading, trailing and side edges of the card;
   means to feed aperture cards one after another from the supply means to a rotating, radiant energy transmissive cylinder so that each aperture card is directly followed by another aperture card during printing;
   means to hold each aperture card fed tightly against the outer diameter surface of said cylinder for transport by the rotating cylinder without covering any part of the radially outer surface of the microfilm piece;
   an optics system passing a beam of radiant energy through the rotating cylinder and microfilm piece passing thereby optically to scan any image on said microfilm piece, said optics system being operative to print the image appearing on the microfilm piece scanned onto a plain paper copy and
   means to remove each aperture card from the cylinder after the microfilm piece has finally passed the optics system.

2. The aperture card printer of claim 1 wherein the means to hold includes powered endless belt means having a drive flight and a return flight, the endless belt means on the drive flight being operative to engage the radially outer surface of the aperture card fed to hold that aperture card on the cylinder and also being operative to rotate the cylinder.

3. The aperture card printer of claim 2 wherein the belt means includes two spaced belts engaging the radially outer surface of each card fed on opposite sides of said aperture, without contacting the microfilm piece carried in that aperture.

4. The aperture card printer of claim 3 wherein the powered endless belt means includes roller means operative not only to maintain the two endless belts on the drive flight tightly against each card fed to the cylinder but also to maintain proper alignment between the two spaced belts to leave the radially outer surface of the microfilm piece uncovered.

5. The aperture card printer of claim 4 wherein the roller means includes three circumferentially spaced roller assemblies around the cylinder and two idler roller assemblies radially outwardly spaced from the cylinder.

6. The aperture card printer of claim 5 wherein the three roller assemblies include a first pivotal roller assembly spring biased toward the cylinder and being positioned upstream of the radiant energy beam of the optics system, a second roller assembly positioned adjacent to and just upstream from the radiant energy beam of the optics system and a third roller assembly positioned downstream of the radiant energy beam of the optics system.

7. The aperture card printer of claim 6 wherein the first roller assembly begins the drive flight and the third roller assembly, which is powered by a reversible motor, ends the drive flight, with unrestricted space of less than 180° being provided for access to the cylinder between the third roller assembly and first roller assembly in the normal direction of cylinder rotation.

8. The aperture card printer of claim 7 wherein the first, second and third roller assemblies and the two endless belts along their drive flight cradle and rotate the cylinder positioned and held therewithin.

9. The aperture card printer of claim 8 further including a stabilizing roll assembly circumferentially positioned between the first and third roller assemblies and radially positioned inside the cylinder, the stabilizing roll assembly resiliently biasing at least one stabilizing roll radially outwardly into engagement with the radially inner surface of the cylinder to stabilize the cylinder during rotation.

10. The card printer of claim 8 wherein the two idler roll assemblies have side flanges to maintain belt alignment and one of the idler roll assemblies has two independently adjustable rolls in contact with the two endless belts on their return flight, said independently adjustable rolls selectively being positioned to retain tension on each of the two belts.

11. The aperture card printer of claim 1 further including a first sensor upstream of the radiant energy beam of the optics system, said first sensor being operative to detect the leading edge of an aperture card being transported to ready the optics system for printing and to program deceleration the cylinder as the microfilm image is being scanned.

12. The aperture card printer of claim 11 further including a second sensor positioned just downstream of the radiant energy beam of the optics system, said second sensor being operative to sense the leading edge of the transported card just as the leading edge of the microfilm piece is about to enter the radiant energy beam to synchronize the optics system to the paper feed to provide proper positioning of the printed image on the paper.

13. The aperture card printer of claim 1 wherein the cylinder is made of glass and has a hollow bore along its entire length.

14. The aperture card printer of claim 13 wherein the optics system includes a light source directing a beam of light into the hollow bore of the cylinder and a mirror positioned in the hollow bore to reflect that light beam radially outwardly through the glass cylinder and microfilm piece.

15. The aperture card printer of claim 14 wherein the optics system includes a condensing lens between the mirror and cylinder and an objective lens radially outside the cylinder, the light source and objective lens being selectively adjustable along the radiant energy path.

16. The aperture card printer of claim 14 further including a fan to draw cooling air through the glass cylinder and across the base of the lamp and its socket.

17. The aperture card printer of claim 1 wherein the means to remove includes a rotatable table having parallel first and second horizontal surfaces, the table being positioned above an aperture card receptacle.

18. The aperture card printer of claim 17 wherein said means to remove includes means to selectively drive the table through 180° rotational increments, the first table surface initially receiving an aperture card removed from the cylinder with the table thereafter being rotated 180° to drop that aperture card into the receptacle and to place the second table surface in position for receiving the next aperture card removed from the cylinder.

19. A high speed aperture card printer comprising:
a supply bin containing at least one aperture card, each aperture card carrying a microfilm piece;
a rotating glass cylinder having a hollow bore;
means to feed each aperture card from the bin to the cylinder for temporary transport on the radially outer surface of the cylinder;
optics means operative to direct a radiant energy beam into the hollow bore and to reflect the radiant energy beam radially outwardly through the cylinder and microfilm piece passing thereby for printing any image on the microfilm piece onto plain paper and
means to remove each aperture card from the cylinder after the microfilm piece therein has finally passed the optics system.

20. The aperture card printer of claim 19 further comprising two spaced endless belts engaging the radially outer surface of the aperture card on either side of the aperture to hold each aperture card tightly on the cylinder and to leave the radially outer surface of the microfilm piece uncovered.

21. A method for high speed printing of images appearing on microfilm pieces respectively carried by aperture cards comprising the steps of:
feeding aperture cards one directly after another onto a rotating cylinder transmissive of radiant energy;
holding the aperture cards tightly against the outer diameter of the cylinder without covering the radially outer surface of the microfilm pieces;
passing radiant energy through the rotating cylinder and microfilm piece transported thereon optically to scan that microfilm piece for printing any image appearing thereon;
and removing each aperture card from the cylinder after the microfilm piece thereon has been finally optically scanned.

22. The method of claim 21 wherein the radiant energy is passed radially outwardly through the rotating cylinder and microfilm piece.

23. The method of claim 22 further comprising the step of reversing the direction of cylinder rotation to return the microfilm piece to a position upstream of the radiant energy for subsequent advancement of the same microfilm piece through the radiant energy to make another copy thereof.

* * * * *